United States Patent
Hodge et al.

(10) Patent No.: US 12,196,301 B2
(45) Date of Patent: Jan. 14, 2025

(54) STAMPED STEEL DIFFERENTIAL HOUSING WITH INTEGRATED FINAL DRIVE GEAR

(71) Applicant: Schaeffler Technologies AG & Co. KG, Herzogenaurach (DE)

(72) Inventors: Michael Hodge, Wadsworth, OH (US); David Burky, Massillon, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/545,075

(22) Filed: Dec. 19, 2023

(65) Prior Publication Data

US 2024/0418250 A1    Dec. 19, 2024

Related U.S. Application Data

(60) Provisional application No. 63/521,197, filed on Jun. 15, 2023.

(51) Int. Cl.
| | |
|---|---|
| *F16H 48/08* | (2006.01) |
| *F16H 48/40* | (2012.01) |
| *F16H 48/38* | (2012.01) |

(52) U.S. Cl.
CPC ............. *F16H 48/40* (2013.01); *F16H 48/08* (2013.01); *F16H 2048/385* (2013.01)

(58) Field of Classification Search
CPC ..... F16H 48/40; F16H 48/08; F16H 2048/385
USPC .................. 475/220, 230; 74/606 R, 607
See application file for complete search history.

(56) References Cited

U.S. PATENT DOCUMENTS

| | | | | |
|---|---|---|---|---|
| 1,980,237 | A * | 11/1934 | Trbojevich | ............ F16H 57/039 74/427 |
| 2,147,146 | A * | 2/1939 | Carlson | ............... F16H 57/0483 184/11.2 |
| 6,176,152 | B1 * | 1/2001 | Victoria | ................... F16H 48/08 475/230 |
| 6,981,929 | B2 | 1/2006 | Janiszewski et al. | |
| 8,221,277 | B2 * | 7/2012 | Vogel | ...................... F16H 48/08 475/230 |
| 10,883,588 | B2 | 1/2021 | Ketchel et al. | |
| 11,441,656 | B2 | 9/2022 | Loeffelmann et al. | |
| 2001/0053729 | A1 * | 12/2001 | Janiszewski | ............ F16H 48/08 475/160 |

(Continued)

FOREIGN PATENT DOCUMENTS

| | | |
|---|---|---|
| DE | 4042173 A1 | 7/1992 |
| EP | 1803972 A1 | 7/2001 |

*Primary Examiner* — Roger L Pang

(57) ABSTRACT

A housing half for a stamped steel differential housing including an outer annular ring and a radially outer cylindrical protrusion with a gear portion. The housing half is integrally formed from a single piece of material. In an example embodiment, the housing half is formed by stamping. In an example embodiment, the gear portion is formed by broaching or rolling. In some example embodiments, the housing half also includes a first pocket arranged for receiving a portion of a first end of a pinion pin and a second pocket, circumferentially opposite the first pocket, arranged for receiving a portion of a second end of the pinion pin. A stamped steel differential housing including the housing half and a stamped steel differential assembly including the stamped steel differential housing are also disclosed.

15 Claims, 2 Drawing Sheets

(56) References Cited

U.S. PATENT DOCUMENTS

| | | | |
|---|---|---|---|
| 2005/0070394 A1* | 3/2005 | Sugeta | F16H 48/08 475/230 |
| 2005/0130785 A1* | 6/2005 | Konda | F16H 55/0886 475/230 |
| 2006/0063633 A1* | 3/2006 | Turner | F16H 57/0447 74/606 R |
| 2013/0281252 A1* | 10/2013 | Fuchs | F16H 48/08 475/230 |
| 2019/0056019 A1 | 2/2019 | Ketchel et al. | |
| 2022/0090667 A1* | 3/2022 | Kisielewicz | F16H 48/38 |

* cited by examiner

STAMPED STEEL DIFFERENTIAL HOUSING WITH INTEGRATED FINAL DRIVE GEAR

CROSS-REFERENCE TO RELATED APPLICATIONS

This application claims the benefit of U.S. Provisional Patent Application No. 63/521,197, filed Jun. 15, 2023, the disclosure of which is incorporated in its entirety by reference herein.

TECHNICAL FIELD

The present disclosure relates generally to a stamped steel differential housing, and more specifically to a stamped steel differential housing with an integrated final drive gear.

BACKGROUND

Constructed differential housings are known. Examples are shown and described in U.S. Pat. No. 6,981,929 titled VEHICLE DIFFERENTIAL to Janiszewski et al., U.S. Pat. No. 10,883,588 titled DIFFERENTIAL ASSEMBLY WITH TWO-PIECE CARRIER AND WELDED RING GEAR to Ketchel et al., commonly-assigned U.S. Pat. No. 11,441,656 titled DIFFERENTIAL COMPRISING PINION GEARS, A DRIVE WHEEL, AND AT LEAST ONE COVER to Loeffelmann et al., European Patent Application publication no. EP 1 803 972 A1 titled DIFFERENTIAL ASSEMBLY, IN PARTICULAR FOR MOTOR VEHICLES to di Martino, and German Patent Application publication no. DE 40 42 173 A1 titled DIFFERENTIALGETRIEBE (DIFFERENTIAL GEAR) to Schmetz.

SUMMARY

Example aspects broadly comprise a housing half for a stamped steel differential housing including an outer annular ring and a radially outer cylindrical protrusion with a gear portion. The housing half is integrally formed from a single piece of material. In an example embodiment, the housing half is formed by stamping. In an example embodiment, the gear portion is formed by broaching or rolling. In some example embodiments, the housing half also includes a first pocket arranged for receiving a portion of a first end of a pinion pin and a second pocket, circumferentially opposite the first pocket, arranged for receiving a portion of a second end of the pinion pin. In some example embodiments, the housing half also includes a first concave surface extending from the first pocket and a second concave surface extending from the second pocket. The first concave surface is for receiving a portion of a convex surface of a first pinion gear and the second concave surface is arranged for receiving a portion of a convex surface of a second pinion gear.

In some example embodiments, the housing half also includes a conical ring extending radially inward from the first concave surface and the second concave surface. In an example embodiment, the conical ring has a plurality of apertures. In some example embodiments, the housing half also includes an inner annular ring extending radially inward from a distal end of the conical ring opposite the first concave surface and the second concave surface. In some example embodiments, the housing half also includes an inner cylindrical protrusion extending axially from a radially inner portion of the annular ring. In an example embodiment, the conical ring extends from the inner annular ring in a first axial direction, and the inner cylindrical protrusion extends from the inner annular ring in a second axial direction, opposite the first axial direction. In an example embodiment, the inner annular ring has raised areas arranged to support an annular surface of a differential side gear.

Other example aspects broadly comprise a stamped steel differential housing including a first housing half and a second housing half, fixed to the first housing half. In an example embodiment, the first housing half gear portion and the second housing half gear portion are arranged to form a double helical gear or a herringbone gear. In an example embodiment, the first housing half is fixed to the second housing half by welding or the first housing half is fixed to the second housing half by fasteners.

Other example aspects broadly comprise a stamped steel differential assembly including the stamped steel differential housing and a pinion pin. Each of the first housing half and the second housing half has respective circumferentially opposite pockets and distal ends of the pinion pin are disposed in the circumferentially opposite pockets. In some example embodiments, the stamped steel differential assembly also includes a pair of pinion gears disposed on the pinion pin. The respective circumferentially opposite pockets are formed in respective concave surfaces of the first housing half and the second housing half, and the pair of pinion gears comprise respective convex surfaces supported by the respective concave surfaces.

In some example embodiments, the stamped steel differential assembly also includes a pair of side gears in meshing engagement with the pair of pinion gears. Each of the first housing half and the second housing half has a respective conical ring extending from the respective concave surfaces and a respective inner annular ring extending radially inwards from the respective conical ring. Each one of the pair of side gears is axially supported on a one of the respective inner annular rings. In an example embodiment, each one of the pair of side gears has a respective inner spline for receiving an axle shaft. In an example embodiment, the stamped steel differential assembly also includes a pair of bearings. Each of the first housing half and the second housing half has a respective inner cylindrical protrusion extending axially from the respective inner annular ring, and each one of the pair of bearings is disposed on an outer cylindrical surface of a one of the respective inner cylindrical protrusions.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
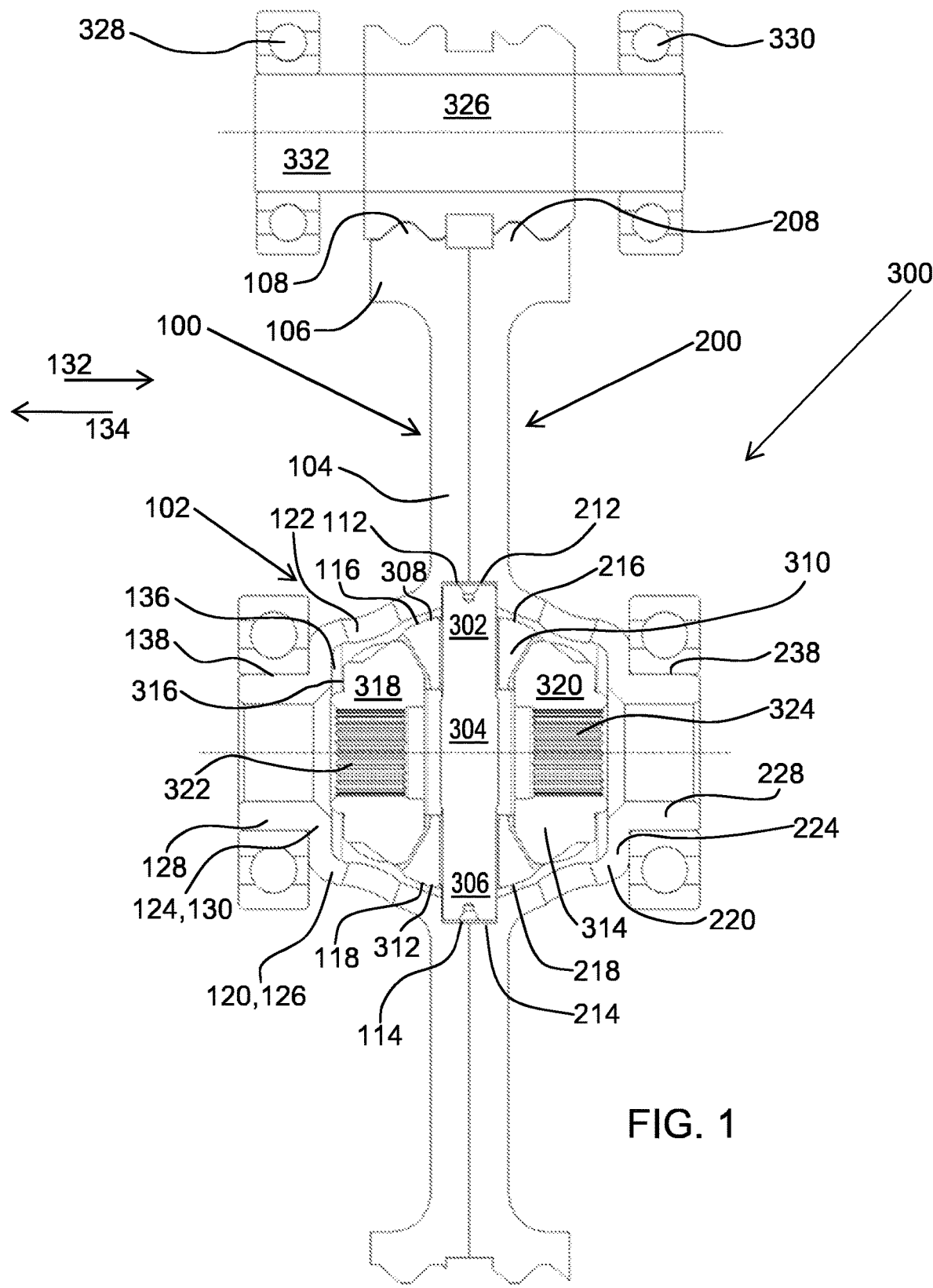
FIG. 1 illustrates a cross-sectional view of a differential assembly according to a first example embodiment.

The following description is made with reference to FIG. 1. FIG. 1 illustrates a cross-sectional view of stamped steel differential assembly 300. Housing half 100 for stamped steel differential housing 102 includes outer annular ring 104 and radially outer cylindrical protrusion 106 comprising gear portion 108. As can be seen in FIG. 1, the housing half is integrally formed from a single piece of material. The housing half may be formed by stamping and the gear portion may be formed by hobbing, broaching, rolling or any known gear manufacturing process. It should be noted that housing half 100 is assembled with housing half 200 (as discussed below) and the broaching or rolling may occur prior to or subsequent to assembly of the two housing halves.

Housing half 100 includes pocket 112 arranged for receiving a portion of a first end of a pinion pin (e.g., end 302 of pinion pin 304 as described below) and pocket 114, circumferentially opposite pocket 112, arranged for receiving a portion of a second end of the pinion pin (e.g., end 306 of pinion pin 304 as described below). Housing half 100 includes concave surface 116 extending from the pocket 112 and concave surface 118 extending from pocket 114. Concave surface 116 is arranged for receiving a portion of a convex surface of a first pinion gear (e.g., convex surface 308 of pinion gear 210 as described below) and concave surface 118 is arranged for receiving a portion of a convex surface of a second pinion gear (e.g., convex surface 212 of pinion gear 214 as described below).

Housing half 100 includes conical ring 120 extending radially inward from the concave surfaces 116 and 118. Conical ring 120 includes apertures 122 providing a flow path for a lubricant through the differential assembly. Housing half 100 includes inner annular ring 124 extending radially inward from distal end 126 of the conical ring opposite concave surfaces 116 and 118. Housing half 100 also includes inner cylindrical protrusion 128 extending axially from radially inner portion 130 of inner annular ring 124. As shown in FIG. 1, conical ring 120 extends from the inner annular ring in axial direction 132 and inner cylindrical protrusion 128 extends from the inner annular ring in axial direction 134, opposite axial direction 132. Inner annular ring 124 includes raised areas 136 arranged to support an annular surface of a differential side gear (e.g., annular surface 216 if differential side gear 218 as described below).

Figure 2:
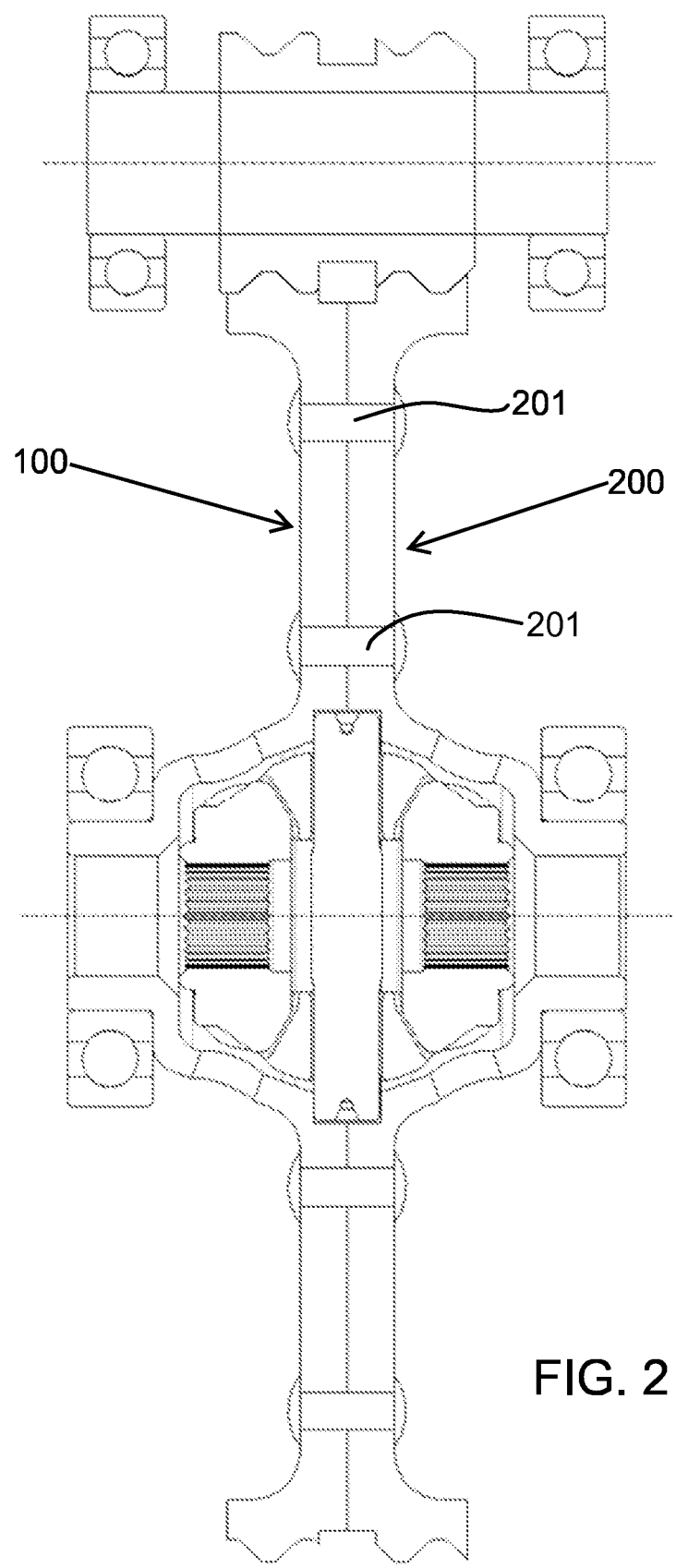
FIG. 2 illustrates a cross-sectional view of a differential assembly according to a second example embodiment.

Stamped steel differential housing 102 includes housing half 100 and housing half 200 fixed to housing half 100. Housing half 100 and housing half 200 may be identically formed, as shown in FIGS. 1-2, or may be different. Gear portion 108 and gear portion 208 are arranged to form a double helical gear or a herringbone gear. A herringbone gear, a specific type of double helical gear, is a side-to-side (not face-to-face) combination of two helical gears of opposite hands. From the top, each helical groove of this gear looks like the letter V, and many together form a herringbone pattern (resembling the bones of a fish). Unlike helical gears, herringbone gears do not produce an additional axial load. In other words, the side-thrust of one half is balanced by that of the other half. Housing half 100 is fixed to housing half 200 by welding, or as shown in FIG. 2, for example, housing half 100 is fixed to housing half 200 by fasteners 201. Fasteners 201 may be bolts, rivets or screws, for example.

Stamped steel differential assembly 300 includes stamped steel differential housing 102 and pinion pin 304. Housing half 100 includes circumferentially opposite pockets 112 and 114 and housing half 200 includes circumferentially opposite pockets 212 and 214. Distal ends 302 and 306 of pinion pin 304 are disposed in the circumferentially opposite pockets. In other words, pockets 112 and 212 form a pocket for receiving distal end 302 and pockets 114 and 214 form a pocket for receiving distal end 306 of the pinion pin. Otherwise stated, each of housing half 100 and 200 includes a formed area creating a portion of a pocket and, when the halves are fixed together, the formed areas form a cylindrical area for receiving pin 304. It should be noted that distal ends 302 and 306 of pin 304 may be non-cylindrical (e.g., square, hexagonal, polygonal, or have flats) and, in this case, pockets 112, 114, 212 and 214 would have corresponding complementary shapes for receiving the distal ends.

Stamped steel differential assembly 300 includes pinion gears 310 and 314 disposed on the pinion pin. That is, the pin provides centering of the pinion gears, but the pinion gears are free to rotate on the pin. Pocket 112 of housing half 100 is formed in concave surface 116 and pocket 114 is formed in concave surface 118. Similarly, pocket 212 of housing half 200 is formed in concave surface 216 and pocket 214 is formed in concave surface 218. Pinion gear 310 includes convex surface 308 supported by concave surfaces 116 and 216, and pinion gear 314 includes convex surface 312 supported by concave surfaces 118 and 218.

Stamped steel differential assembly 300 includes side gears 318 and 320 in meshing engagement with pinion gears 310 and 314. Housing half 100 includes conical ring 120 extending from concave surfaces 116 and 118, and inner annular ring 124 extending radially inwards from conical ring 120. Similarly, housing half 200 includes conical ring 220 extending from concave surfaces 216 and 218, and inner annular ring 224 extending radially inwards from conical ring 220. Side gear 318 is axially supported on inner annular ring 124 and side gear 320 is axially supported on inner annular ring 224. Side gears 318 and 320 comprise respective inner splines 322 and 324 for receiving an axle shaft (not shown).

Stamped steel differential assembly 300 includes bearings 326 and 328. Housing half 100 includes inner cylindrical protrusion 128 extending axially from inner annular ring 124 and housing half 200 includes inner cylindrical protrusion 228 extending axially from inner annular ring 224. Bearing 326 is disposed on outer cylindrical surface 138 of inner cylindrical protrusion 128 and bearing 328 is disposed on outer cylindrical surface 238 of inner cylindrical protrusion 228. Gears 108 and 208 may be intermeshed with gear 326 supported on bearings 328 and 330 by shaft 332 in a vehicle application, for example, to provide a final drive ratio for an output of a vehicle transmission.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Housing half (first)
102 Stamped steel differential housing
104 Outer annular ring
106 Outer cylindrical protrusion
108 Gear portion
112 Pocket (first)
114 Pocket (second)
116 Concave surface (first)
118 Concave surface (second)
120 Conical ring
122 Apertures (conical ring)
124 Inner annular ring
126 Distal end (conical ring)
128 Cylindrical protrusion
130 Radially inner portion (inner annular ring)
132 Axial direction (first)
134 Axial direction (second)
136 Raised areas (inner annular ring)
138 Outer cylindrical surface (cylindrical protrusion)
200 Housing half (second)
201 Fasteners
208 Gear portion
212 Pocket (first)
214 Pocket (second)
216 Concave surface (first)
218 Concave surface (second)
220 Conical ring
224 Inner annular ring
228 Cylindrical protrusion
238 Outer cylindrical surface (cylindrical protrusion)
300 Stamped steel differential assembly
302 End (first, pinion pin)
304 Pinion pin
306 End (second, pinion pin)
308 Convex surface (pinion gear 310)
310 Pinion gear (first)
312 Convex surface (pinion gear 314)
314 Pinion gear (second)
316 Annular surface (side gear 318)
318 Side gear (first)
320 Side gear (second)
322 Inner spline (side gear 318)
324 Inner spline (side gear 320)
326 Gear
328 Bearing
330 Bearing
332 Shaft

What is claimed is:

1. A housing half for a stamped steel differential housing, integrally formed from a single piece of material, and comprising:
    an outer annular ring;
    a radially outer cylindrical protrusion comprising a gear portion;
    a first pocket arranged for receiving a portion of a first end of a pinion pin and a second pocket, circumferentially opposite the first pocket, arranged for receiving a portion of a second end of the pinion pin;
    a first concave surface extending from the first pocket and a second concave surface extending from the second pocket;
    a conical ring extending radially inward from the first concave surface and the second concave surface; and
    an inner annular ring extending radially inward from a distal end of the conical ring opposite the first concave surface and the second concave surface, the inner annular ring comprising raised areas arranged to support an annular surface of a differential side gear.

2. The housing half of claim 1 wherein the housing half is formed by stamping.

3. The housing half of claim 1 wherein the gear portion is formed by hobbing, broaching or rolling.

4. The housing half of claim 1, wherein:
    the first concave surface is arranged for receiving a portion of a convex surface of a first pinion gear; and
    the second concave surface being is arranged for receiving a portion of a convex surface of a second pinion gear.

5. The housing half of claim 1 wherein the conical ring comprises a plurality of apertures.

6. The housing half of claim 1 further comprising an inner cylindrical protrusion extending axially from a radially inner portion of the inner annular ring.

7. The housing half of claim 6 wherein:
    the conical ring extends from the inner annular ring in a first axial direction; and
    the inner cylindrical protrusion extends from the inner annular ring in a second axial direction, opposite the first axial direction.

8. A stamped steel differential housing, comprising:
    a first housing half; and
    a second housing half, fixed to the first housing half, wherein each of the first housing half and the second housing half is integrally formed from a single piece of material and comprises:
    an outer annular ring; and
    a radially outer cylindrical protrusion comprising a gear portion.

9. The stamped steel differential housing of claim 8 wherein:
    the first housing half gear portion and the second housing half gear portion are arranged to form a double helical gear or a herringbone gear.

10. The stamped steel differential housing of claim 8 wherein:

the first housing half is fixed to the second housing half by welding; or the first housing half is fixed to the second housing half by fasteners.

11. A stamped steel differential assembly comprising:
the stamped steel differential housing of claim 8; and
a pinion pin, wherein each of the first housing half and the second housing half comprises respective circumferentially opposite pockets and distal ends of the pinion pin are disposed in the circumferentially opposite pockets.

12. The stamped steel differential assembly of claim 11 further comprising a pair of pinion gears disposed on the pinion pin, wherein:
the respective circumferentially opposite pockets are formed in respective concave surfaces of the first housing half and the second housing half; and
the pair of pinion gears comprise respective convex surfaces supported by the respective concave surfaces.

13. The stamped steel differential assembly of claim 12 further comprising a pair of side gears in meshing engagement with the pair of pinion gears, wherein:
each of the first housing half and the second housing half comprises:
a respective conical ring extending from the respective concave surfaces; and
a respective inner annular ring extending radially inwards from the respective conical ring; and
each one of the pair of side gears is axially supported on a one of the respective inner annular rings.

14. The stamped steel differential assembly of claim 13 wherein each one of the pair of side gears comprises a respective inner spline for receiving an axle shaft.

15. The stamped steel differential assembly of claim 13 further comprising a pair of bearings, wherein:
each of the first housing half and the second housing half comprises a respective inner cylindrical protrusion extending axially from the respective inner annular ring; and
each one of the pair of bearings is disposed on an outer cylindrical surface of a one of the respective inner cylindrical protrusions.

* * * * *